United States Patent [19]
Pope

[11] Patent Number: 5,042,197
[45] Date of Patent: Aug. 27, 1991

[54] PLANT CONTAINER HAVING SELECTABLE DRAINAGE CHARACTERISTICS

[75] Inventor: Graeme S. Pope, Longwood, Fla.

[73] Assignee: Gale Group, Inc., Apopka, Fla.

[21] Appl. No.: 511,289

[22] Filed: Apr. 20, 1990

[51] Int. Cl.⁵ .............................................. A01G 25/00
[52] U.S. Cl. ........................................... 47/79; 47/71; 47/80
[58] Field of Search ..................... 47/71, 79, 80, 81

[56] References Cited

U.S. PATENT DOCUMENTS

| | | | |
|---|---|---|---|
| 124,207 | 3/1872 | Hess | 47/81 X |
| 577,800 | 2/1897 | Waterer | 47/80 |
| 2,605,588 | 8/1952 | Lindstaedt | 47/79 |
| 2,638,716 | 5/1953 | Luipersbek | 47/79 |
| 3,557,490 | 1/1971 | Delaney | 47/81 |
| 3,866,351 | 2/1975 | Cobia | 47/81 |
| 3,975,860 | 8/1976 | Harned et al. | 47/81 |
| 4,077,159 | 3/1978 | Haglund | 47/79 X |
| 4,434,577 | 3/1984 | Holtkamp | 47/81 |
| 4,531,324 | 7/1985 | Yang et al. | 47/81 |
| 4,937,974 | 7/1990 | Costa, Jr. et al. | 47/81 |

Primary Examiner—Richard E. Chilcot, Jr.
Assistant Examiner—Linda J. Watson

[57] ABSTRACT

A container for plants is defined by a bottom and side walls, and a drainage riser extending interiorly from the bottom, the riser having drainage openings adjacent the interior extremity and including an opening communicating through the bottom. A removable plug is provided for closing the bottom opening, as desired. A plant support and drainage platform is removably fitted across the enclosure above the extremity of the drainage riser, so as to define a plenum between the drainage platform and the riser.

10 Claims, 2 Drawing Sheets

PLANT CONTAINER HAVING SELECTABLE DRAINAGE CHARACTERISTICS

BACKGROUND OF THE INVENTION

1. Field of the Invention

The present invention relates to plant containers, and in particular plant containers which are provided with means for permitting water to be segregated from the plant and selectably drained.

2. Description of the Prior Art

There are a variety of plant containers described in the prior art. It is known to provide means within the pot for supporting the plant above the bottom of the container, in order to permit water to be drained from the roots and surrounding soil, and to prevent the standing of water which might otherwise cause rotting of the root structure.

It is also known in the prior art to incorporate in a plant container means which permits water at the bottom of the container to be easily drained. This technique is especially useful for plant containers used during the initial growing of the plant by a commercial nursery, since it is customary to accelerate the growing of the plant through frequent watering. However, plant containers provided with such drainage means are not suitable for use in a home or office, since the drained water will stain or soil rugs or furniture. One solution of this problem has been to provide a saucer which fits to the bottom of the container used for commercial growing, in order to permit excess water to stand until evaporated or drawn back up into the root structure. However, prior art saucer arrangements do not always avoid the undesirable staining discussed above.

SUMMARY OF THE INVENTION

The present invention is directed to a plant container which is especially suitable for use inside a home or office, and which has means readily permitting the draining of excess water from frequent watering of the plant, either during growing or, for example, when the plant is located outdoors. To this end, the plant container is provided with means which not only permits internal drainage of the excess water from the root structure and surrounding soil, but which also provides means for selectably interdicting the flow of water from the bottom of the container, as desired, to prevent water flow out of the container when it is located indoors. The plant container in accordance with the present invention comprises a housing defined by a bottom and side walls, with a drainage riser molded into and extending interiorly from the bottom, the drainage riser having drainage openings adjacent the interior extremity thereof (that is, the upper extremity) and including an opening communicating through the bottom. The container is provided with removable means, such as a plug, to open and close the bottom opening of the drainage riser. A plant support and drainage platform is removably fitted across the enclosure above the interior extremity of the drainage riser, so as to define a plenum between the drainage platform and the drainage riser into which excess water may be drained. The drainage platform has plural openings permitting water to drain into the plenum.

In accordance with the preferred embodiment of the present invention, the housing is a unitary molded member having a generally rectangular cross section, with the periphery of the plant support and drainage platform conforming in shape and dimension to the side walls of the housing so as to engage the sidewalls at a predetermined uniform height above the interior extremity of the drainage riser. Means are provided for frictionally engaging the drainage platform in a predetermined position in the enclosure; in the preferred embodiment, the frictionally engaging means comprises plural, spaced friction posts extending interiorly from the bottom with plural, spaced protrusions extending downwardly into the plenum from the drainage platform. Each protrusion has an opening for frictionally engaging a corresponding post. The rectangular configuration (or any other configuration which permits the desired indexing of the protrusions to the friction post) permits the automatic alignment of each of the posts with the opening of one of the protrusions. Suitably, there is provided four spaced protrusions and four corresponding friction posts, each located adjacent a corresponding corner of the rectangular configuration of the platform and bottom.

In use, the drainage platform may be easily installed into the container by sliding downwardly along the side walls, with each friction post being automatically aligned with a corresponding friction opening of one of the downwardly extending protrusions. The bottom of each protrusion engages the bottom of the container, thereby defining the plenum between the platform and the bottom for excess water draining through the platform. The drainage riser extending from the bottom has its drainage openings at its upper extremity, that is, at the extremity closest to the drainage platform. Therefore, there is a portion of the plenum from which water does not drain, and which provides a safety feature in the event that the plug is inadvertently omitted when the plant container is being used indoors.

Other features of the plant container of the present invention will become apparent from the drawings and the detailed description, set forth below.

THE DRAWINGS

DETAILED DESCRIPTION

The plant container of the present invention will now be described with reference to FIGS. 1-4.

Figure 1:
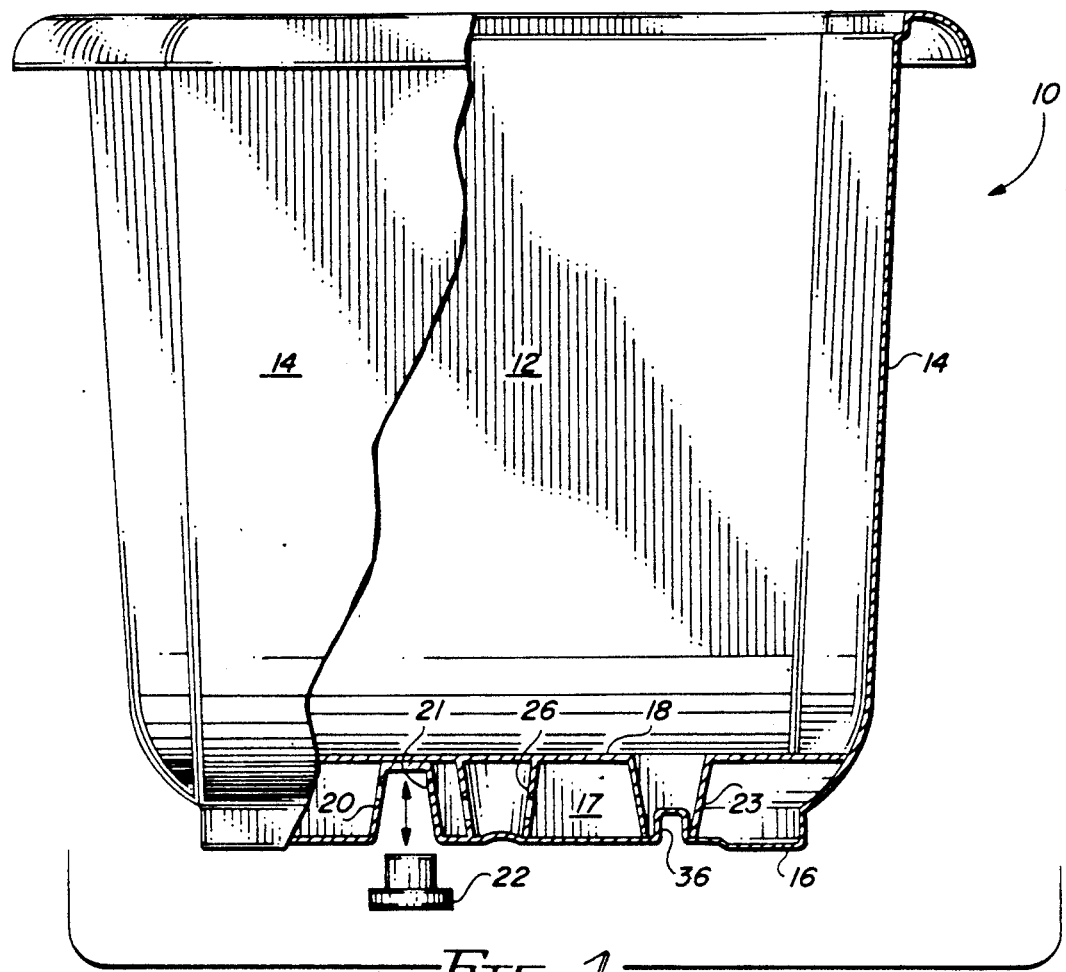
FIG. 1 is a side elevation, partially in cross section, of the plant container in accordance with the present invention.
Figure 2:
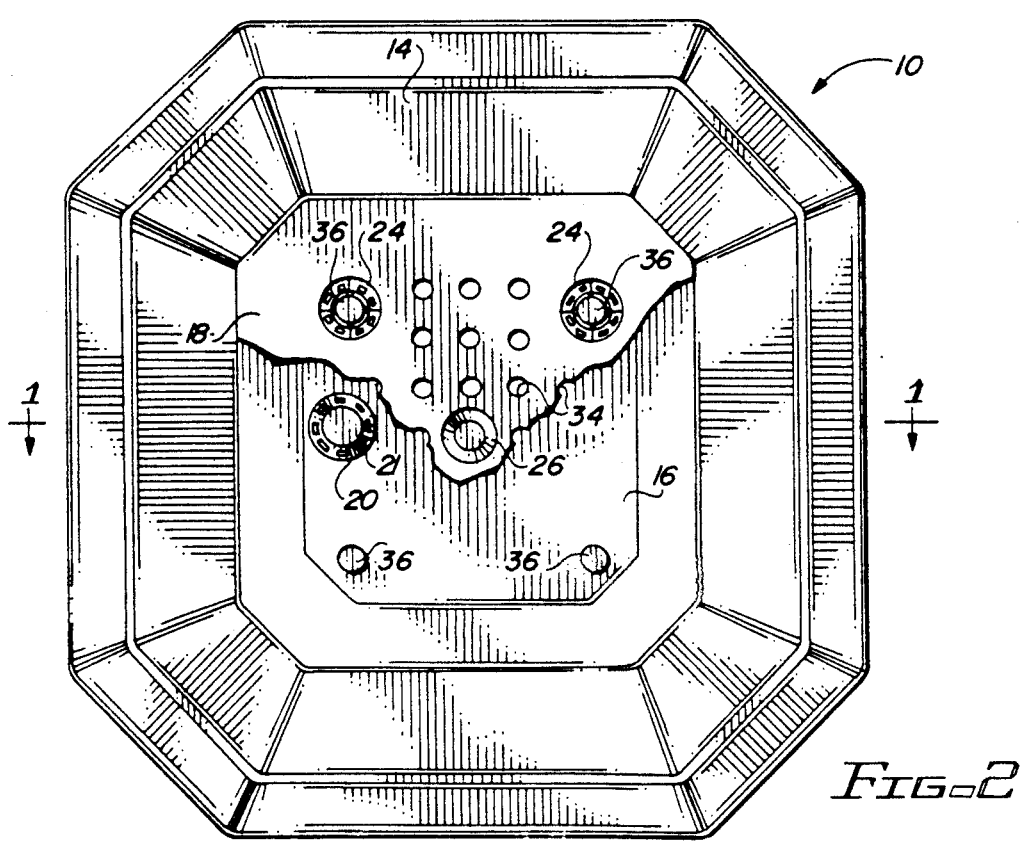
FIG. 2 is a top plan view of the plant container in accordance with the present invention, with a portion of the drainage platform broken away.

The plant container is referred to generally by the reference numeral 10, and comprises an enclosure 12 defined by a bottom 16 and side walls 14. As shown in FIG. 2, it is preferred that the container has a generally rectangular configuration, such as the generally square configuration shown in FIG. 2 (the corners of the square may be bevelled for aesthetic purposes, as shown in FIG. 2). The container 10 includes a drainage platform 18, the periphery of which is dimensioned and shaped to correspond to the cross section of the interior of the side walls 14, so that the drainage platform 18 may easily slide downwardly along the inner portion of the side walls 14, and be located near the bottom 16 at a predetermined uniform height (note FIG. 1). Preferably, the platform 18 extends just across the interior extremity of a drainage riser 20, described in greater detail below, so as to define a plenum 17 between the platform 18 and the bottom 16.

The container 10 includes a drainage riser 20 molded into the bottom 16 and extending interiorly, the drainage riser having openings 21 at the interior extremity thereof, and being open along the bottom 16 so as to receive a removable plug 22.

Figure 3:
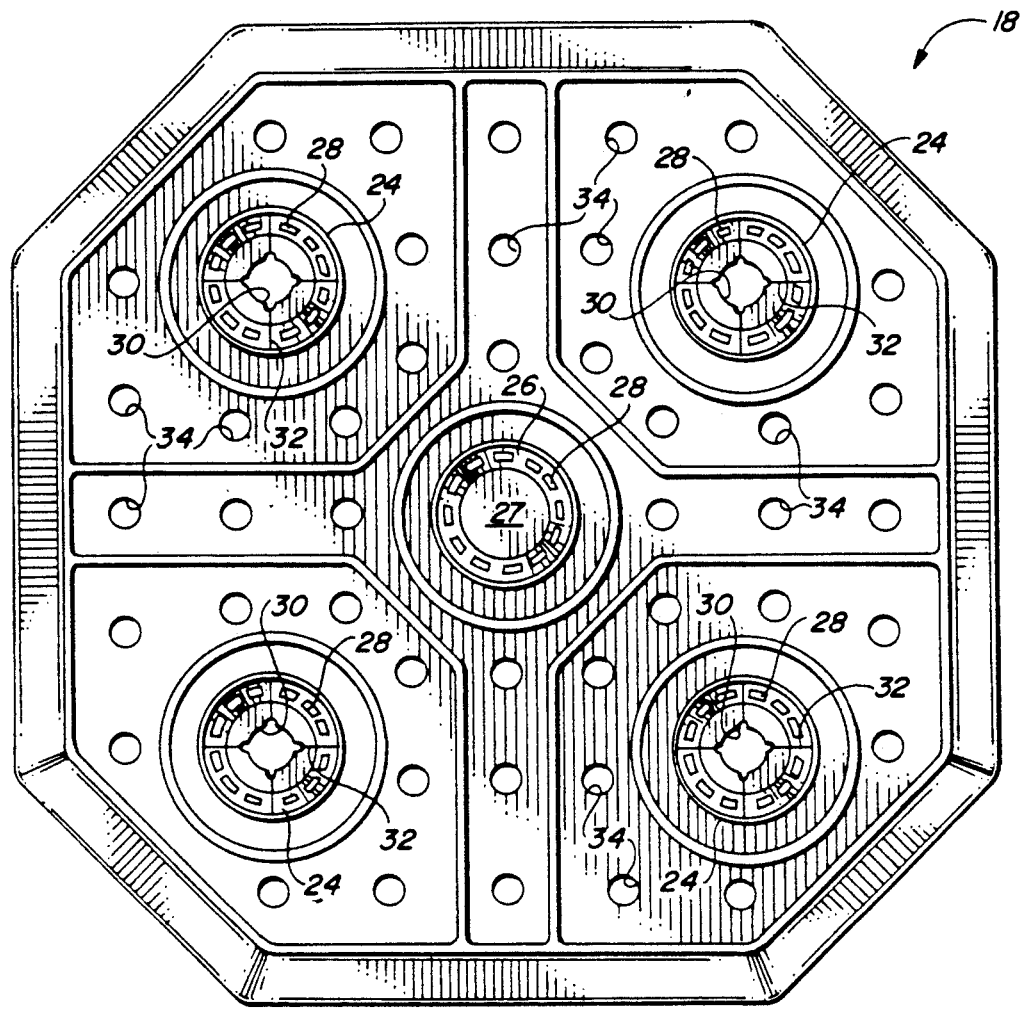
FIG. 3 is a top plan view of the drainage platform in accordance with the present invention.
Figure 4:
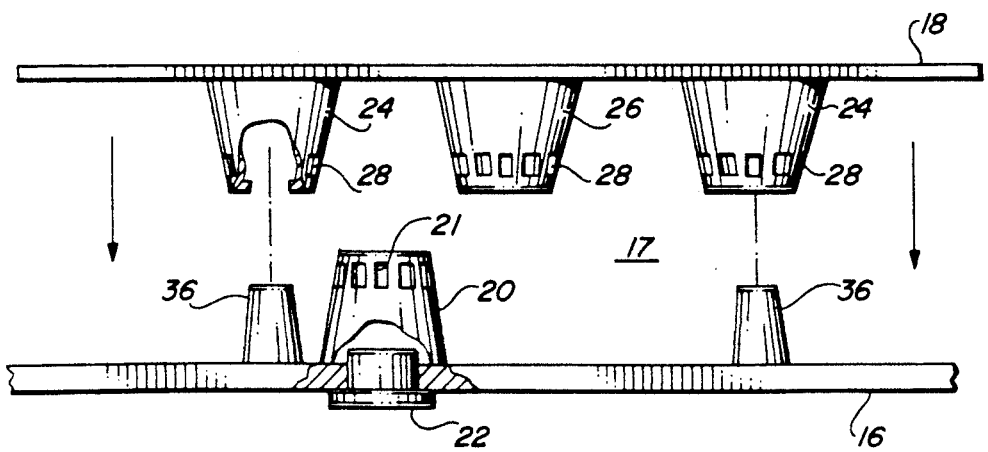
FIG. 4 is an exploded side view of the bottom of the container and the drainage platform in accordance with the present invention.

In accordance with the present invention, the container 10 is provided with means for frictionally engaging and aligning the platform 18 with the bottom 16 and side walls 14; these features are described next with reference to FIGS. 2, 3 and 4.

In order to achieve the frictional engagement and alignment of the platform 18, the platform is provided with plural protrusions 24 extending downwardly toward the bottom 16, each protrusion spaced from the other and being aligned with a frictional post 36, described in greater detail below. Each protrusion 24 includes a frictional opening 30, and cross-slots 32 to facilitate the frictional engagement of the opening 30 with the frictional post 36. Drainage openings 28 are located at the extremity of each protrusion 24.

The frictional posts 36 extend upwardly and interiorly from the bottom 16, and may be integrally molded therewith. Each frictional post 36 has a tapered dimension so as to extend easily into a corresponding opening 30, and thereafter make frictional engagement near the bottom of each post 36.

The platform 18 may also be provided with a central protrusion 26 having a closed bottom 27, and with drainage openings 28 at its bottom. The platform 18 may also be provided with additional drainage openings 34 across the plane of the platform.

It will be appreciated by those skilled in the horticultural arts that the plant container 10 of the present invention is useful for both the growing of the plant, and the subsequent displaying of the plant within a home or office. The plenum 17 provides an area in which water may be drained from the roots and surrounding soil of the plant, which rests upon the platform 18. This of course prevents the rotting of the root sometimes caused by standing water. Further, however, the drainage riser 20 provides a means in which excess water contained in the plenum 17 may be drained through the openings 21 and out of the opening at the bottom of the riser, when the plug 22 is removed. Thus, when there is excess water in the plenum 17 when the plant has received too much water (as, for example, during the frequent waterings that take place during growing or if the plant is located outdoors), then the water may be easily drained out of the plenum without any water standing within the level of the root structure. However, if the plant container 10 is to be located within a home or office, then the plug 22 may be inserted in the bottom opening of the drainage riser 20, thereby preventing any water drainage which might otherwise soil or damage a rug or furniture upon which the plant container 10 rests.

It will thus be understood that the plant container of the present invention is easily adaptable to a wide variety of circumstances and uses.

What is claimed is:

1. A container for plants comprising:

a housing having an interior defined by a bottom and side walls;

a drainage riser extending into the interior from the bottom, the drainage riser having an extremity extending away from the bottom with drainage openings adjacent the extremity, the riser further including an opening communicating through the bottom;

removable means for opening and closing the bottom opening of the drainage riser; and a plant support and drainage platform removably fitted across the enclosure above the extremity of the drainage riser so as to define a plenum between the drainage platform and the drainage riser, the drainage platform having plural openings permitting water to drain into the plenum.

2. The plant container recited in claim 1 further comprising means for frictionally engaging the drainage platform into a predetermined position in the housing.

3. The plant container recited in claim 2 wherein the frictionally engaging means comprises:

plural, spaced friction posts extending into the interior from the bottom;

plural, spaced protrusions extending downwardly into the plenum from the drainage platform, each protrusion having an opening for frictionally engaging a corresponding post; and means for aligning each of the posts with the opening of one of the protrusions.

4. The plant container recited in claim 3 wherein each protrusion has drainage openings at the extremity thereof.

5. The plant container recited in claim 3 wherein the means for aligning comprises the side walls having an interior peripheral dimension and configuration corresponding to that of the drainage platform, whereby the side walls align the frictional openings of the protrusions with the friction post.

6. The plant container recited in claim 3 wherein the drainage riser is positioned between the plural protrusions.

7. The plant container recited in claim 3 further comprising a central protrusion extending downwardly into the plenum, the central protrusion having a closed bottom and plural drainage openings at the extremity thereof.

8. A container for plants, comprising:

a housing having an interior defined by a bottom and side walls;

a drainage riser extending into the interior from the bottom, the drainage riser having an extremity extending away from the bottom with drainage openings adjacent the extremity, the riser further including an opening communicating through the bottom;

a plant support and drainage platform removably fitted across the enclosure above the extremity of the drainage riser so as to define a plenum between the drainage platform and the drainage riser, the drainage platform having plural openings permitting water to drain into the plenum; and means for aligning the drainage platform with the sidewalls and bottom of the housing for frictional engagement therewith.

9. The plant container recited in claim 8 wherein the aligning means comprises:

plural, spaced alignment posts extending interiorly from the bottom; and plural, spaced protrusions extending downwardly into the plenum from the drainage platform, each protrusion having an alignment opening for engaging a corresponding alignment post.

10. A container for plants, comprising a unitary molded housing defined by an integral bottom and side walls and having a generally rectangular cross section;

a drainage riser molded into and extending into the housing from the bottom, the drainage riser having an extremity extending away from the bottom with drainage openings only adjacent the extremity, the riser further including an opening communicating through the bottom;

plural, spaced posts extending into the housing from the bottom and molded integrally therewith; and a plant support and drainage platform having a peripheral shape and dimension corresponding to the side walls and engaging the side walls at a predetermined uniform height above the extremity of the drainage riser so as to define a plenum between the drainage platform and the drainage riser, the drainage platform including plural, spaced protrusions extending downwardly into the plenum from the drainage platform, each protrusion having an opening for frictionally engaging a corresponding post.

* * * * *